United States Patent [19]
Tozu et al.

[11] Patent Number: 5,913,578
[45] Date of Patent: Jun. 22, 1999

[54] VEHICLE MOTION CONTROL SYSTEM

[75] Inventors: Kenji Tozu, Yokkaichi; Yoshiyuki Yasui, Kariya; Takayuki Itoh, Nagoya; Norio Yamazaki, Kariya, all of Japan

[73] Assignee: Aisin Seiki Kabushiki Kaisha, Kariya, Japan

[21] Appl. No.: 08/959,072

[22] Filed: Oct. 28, 1997

[30] Foreign Application Priority Data

Oct. 30, 1996 [JP] Japan .................................... 8-305810

[51] Int. Cl.⁶ ....................................................... B60T 8/24
[52] U.S. Cl. ........................... 303/140; 303/147; 303/188
[58] Field of Search ................................... 303/140, 146, 303/147, 188

[56] References Cited

U.S. PATENT DOCUMENTS

| | | | |
|---|---|---|---|
| 4,898,431 | 2/1990 | Karnopp et al. | 303/146 |
| 5,620,239 | 4/1997 | Mihara et al. | 303/147 |
| 5,694,321 | 12/1997 | Eckert et al. | 303/140 |
| 5,711,585 | 1/1998 | Tozu et al. | 303/140 |
| 5,752,752 | 5/1998 | Tozu et al. | 303/140 |
| 5,762,406 | 6/1998 | Yasui et al. | 303/147 |
| 5,829,847 | 11/1998 | Tozu et al. | 303/147 |

FOREIGN PATENT DOCUMENTS 7-117654   5/1995   Japan .

*Primary Examiner*—Lee W. Young
*Assistant Examiner*—Robert Siconolfi
*Attorney, Agent, or Firm*—Burns, Doane, Swecker & Mathis, L.L.P.

[57] ABSTRACT

The present invention is directed to a vehicle motion control system for maintaining stability of an automotive vehicle when the vehicle is in motion, by controlling a hydraulic braking pressure control apparatus to control a hydraulic braking pressure in each of wheel brake cylinders operatively mounted on each wheel of the vehicle to control a braking force applied thereto. A steering control unit and an anti-skid control unit are provided for actuating the apparatus to control the braking force applied to at least one of the wheels, respectively. A pressure increase compensating unit is provided for controlling a pressure increasing rate for increasing the braking pressure in at least one of the wheel brake cylinders to a desired pressure which is set after the pressure decreasing operation when the braking pressure with respect to at least one of the wheels is controlled in accordance with the control performed by the steering control unit and the control performed by the anti-skid control unit simultaneously, to be greater than a pressure increasing rate for increasing the braking pressure to the desired pressure in accordance with the control performed only by the anti-skid control unit.

5 Claims, 13 Drawing Sheets

VEHICLE MOTION CONTROL SYSTEM

BACKGROUND OF THE INVENTION

1. Field of the Invention

The present invention relates to a vehicle motion control system for controlling vehicle motion, and more particularly to the control system which performs a steering control by braking to restrain an excessive oversteer and excessive understeer which will occur during, for example, cornering, by applying a braking force to each wheel of the vehicle irrespective of depression of a brake pedal, and which performs an anti-skid control to prevent a wheel from being locked during braking, by controlling the braking force applied to the wheel.

2. Description of the Related Arts

Recently, a vehicle is provided with a braking force control system for controlling the braking force applied to the vehicle to perform an anti-skid control, a traction control, a front-rear braking force distribution control, and etc. In the U.S. Pat. No. 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering. Consequently, a braking force is applied to each wheel irrespective of depression of a brake pedal, so that a so-called steering control by braking is performed to provide an oversteer restraining control and understeer restraining control.

With respect to a braking force control apparatus for applying a braking force to each wheel of a vehicle in response to a braking condition of the vehicle to correct the vehicle motion, it is proposed in a Japanese Patent Laid-open Publication No. 7-117654 to correct an abnormal vehicle motion rapidly and properly by introducing a feedforward control in addition to a feedback control. In the apparatus, a feedforward control signal is output in response to a desired slip rate, and coupled with a feedback control signal which is output separately from the feedforward control signal, to produce an output signal to a hydraulic pressure control apparatus.

In the recent vehicle, also provided are an anti-skid control mode wherein a hydraulic braking pressure supplied to a wheel brake cylinder is controlled in response to a rotational speed of a wheel so as to control the braking force applied to the wheel, and the like modes, so that the anti-skid control mode and the like are combined with the mode of steering control by braking to provide the effective vehicle motion control system as a whole. In this case, when a pressure decreasing operation for the anti-skid control is performed, a pressure decrease compensating control for modifying an amount of pressure to be decreased is provided so as to prevent an excessive amount of decreased pressure which will result in an excessive decrease of the wheel acceleration and cornering force. Whereas, a pressure increase compensating control is performed after the pressure decreasing operation is terminated, so as to increase the braking pressure in response to a total amount of the decreased pressure, so that an amount of pressure to be increased is modified in response to a total time of the pressure decreasing operation performed until the previous cycle, wheel acceleration, coefficient of friction of a road or the like, for example.

However, the braking force applied to the individual wheel is to be controlled in accordance with one of the control modes. Therefore, in the case where the anti-skid control mode is selected when a certain wheel is under control in accordance with the steering control by braking mode, for example, only the pressure decreasing operation shall be performed for the steering control, because the braking force can not be increased during the anti-skid control mode, whereas excessive pressure decreasing operation will result in the decrease of the braking force. This results from the difference between the anti-skid control mode which is provided for decreasing the braking force applied to the wheel which is about to be locked, and the steering control by braking mode which is provided for applying the braking force to the wheel so as to control its steering angle. In this case, therefore, it is necessary to select the anti-skid control mode in advance, but it is not desirable to terminate the steering control operation.

FIG. 16 illustrates a $\mu$-S curve which indicates a relationship between a coefficient of friction $\mu$ of a road or cornering force CF and a slip rate S. And, FIG. 17 illustrates a condition under an anti-skid control with respect to a certain wheel, wherein points (a)–(d) correspond to the points (a)–(d) indicated on the $\mu$-S curve in FIG. 16. In FIG. 17, Vso indicates an estimated vehicle speed, Vw indicates a wheel speed, Wc** indicates a wheel cylinder pressure. In FIGS. 16, 17, point (c) indicates a peak value of the coefficient of friction ($\mu$-peak) at which the anti-skid control starts, point (d) indicates an end of rapid pressure decreasing operation, point (a) indicates a transitional point from a hold (or, pressure decreasing operation) to a pressure increasing operation, and point (b) indicates an end of a pressure increase compensating control. As shown in FIG. 17, a zone from the point (c) to the point (a) corresponds to the zone for performing the pressure decrease compensating control, while a zone from the point (a) to the point (b) corresponds to the zone for performing the pressure increase compensating control.

In view of the fact that the cornering force CF is rapidly decreased in the transition from the point (a) to the point (d) as apparent from FIG. 16, the steering control by braking can be performed. In this case, in order to decrease the cornering force CF rapidly, the transition from the point (a) to the point (c) or (d) is to be made immediately. It is, however, necessary to make the transition from the point (a) to the point (b) immediately after the pressure decreasing operation, by the pressure increase compensating control so as not to affect the anti-skid control.

Therefore, in the case where the steering control by braking and the anti-skid control are performed simultaneously with respect to a wheel to be controlled, e.g., where the steering control by braking is performed when the wheel is under the anti-skid control, or where the anti-skid control is performed when the wheel is under the steering control by braking, if the cornering force is decreased rapidly, the steering control can be performed without affecting the anti-skid control. Furthermore, with respect to a desired slip rate set for the steering control by braking, it might be excessive for the anti-skid control. Therefore, when the anti-skid control is performed with respect to the wheel to be controlled, it is necessary to provide a certain limit for the desired slip rate.

SUMMARY OF THE INVENTION

Accordingly, it is an object of the present invention to provide a vehicle motion control system which controls the braking force so as to decrease the cornering force immediately when a steering control by braking and an anti-skid control are performed simultaneously, to perform both controls smoothly.

It is another object of the present invention to provide a vehicle motion control system which limits a desired slip rate provided for a steering control by braking, when an anti-skid control is being performed with respect to a wheel to be controlled, to perform the anti-skid control properly.

In accomplishing the above and other objects, a vehicle motion control system is provided for maintaining stability of an automotive vehicle when the vehicle is in motion, by controlling a hydraulic braking pressure in each of wheel brake cylinders operatively mounted on wheels of the vehicle, respectively, to control a braking force applied to each wheel of the vehicle. In the system, therefore, a hydraulic braking pressure control apparatus is provided for controlling the braking pressure in each of the wheel brake cylinders at least in response to depression of a brake pedal. A vehicle condition monitor is provided for monitoring a condition of the vehicle in motion. Steering control means is provided for actuating the apparatus to increase and decrease the braking pressure in at least one of the wheel brake cylinders operatively mounted on at least one of the wheels to control the braking force applied thereto, on the basis of the output of the monitor means and irrespective of depression of the brake pedal. Anti-skid control means is provided for actuating the apparatus to decrease and increase the braking pressure in at least one of the wheel brake cylinders operatively mounted on at least one of the wheels to control the braking force applied thereto, in response to a rotational condition thereof during braking, on the basis of the output of the monitor means. And, pressure increase compensating means is provided for controlling a pressure increasing rate for increasing the braking pressure to a desired pressure which is set after the pressure decreasing operation made by the apparatus when the braking pressure with respect to at least one of the wheels is controlled in accordance with the control performed by the steering control means and the control performed by the anti-skid control means simultaneously, to be greater than a pressure increasing rate for increasing the braking pressure to the desired pressure in accordance with the control performed only by the anti-skid control means.

Preferably, the hydraulic braking pressure control apparatus is adapted to provide a plurality of control modes including a rapid pressure increase mode for increasing the braking pressure in at least one of the wheel brake cylinders by a relatively rapid rate comparing with the other control modes, and the pressure increase compensating means is adapted to provide the rapid pressure increase mode when the braking pressure with respect to at least one of the wheels is controlled in accordance with the control performed by the steering control means and the control performed by the anti-skid control means simultaneously, for a longer period than the period during which the rapid pressure increase mode is provided when the braking pressure is controlled in accordance with the control performed only by the anti-skid control means.

The hydraulic braking pressure control apparatus may be adapted to provide a plurality of control modes including a pulse pressure increase mode for increasing the braking pressure in at least one of the wheel brake cylinders gradually by increasing the braking pressure therein intermittently in accordance with a duty ratio, and the pressure increase compensating means may be adapted to set the duty ratio for the pulse pressure increase mode when the braking pressure with respect to at least one of the wheels is controlled in accordance with the control performed by the steering control means and the control performed by the anti-skid control means simultaneously, to be greater than the duty ratio for the pulse pressure increase mode which is set when the braking pressure is controlled in accordance with the control performed only by the anti-skid control means.

The vehicle motion control system may further include desired slip rate setting means for setting a desired slip rate for each wheel of the vehicle during braking, and the hydraulic braking pressure control apparatus may be controlled in response to the desired slip rate. And, the desired slip rate setting means may be adapted to limit the desired slip rate which is set when the braking pressure with respect to at least one of the wheels is controlled in accordance with the control performed by the steering control means and the control performed by the anti-skid control means simultaneously, to be lower than a predetermined value.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
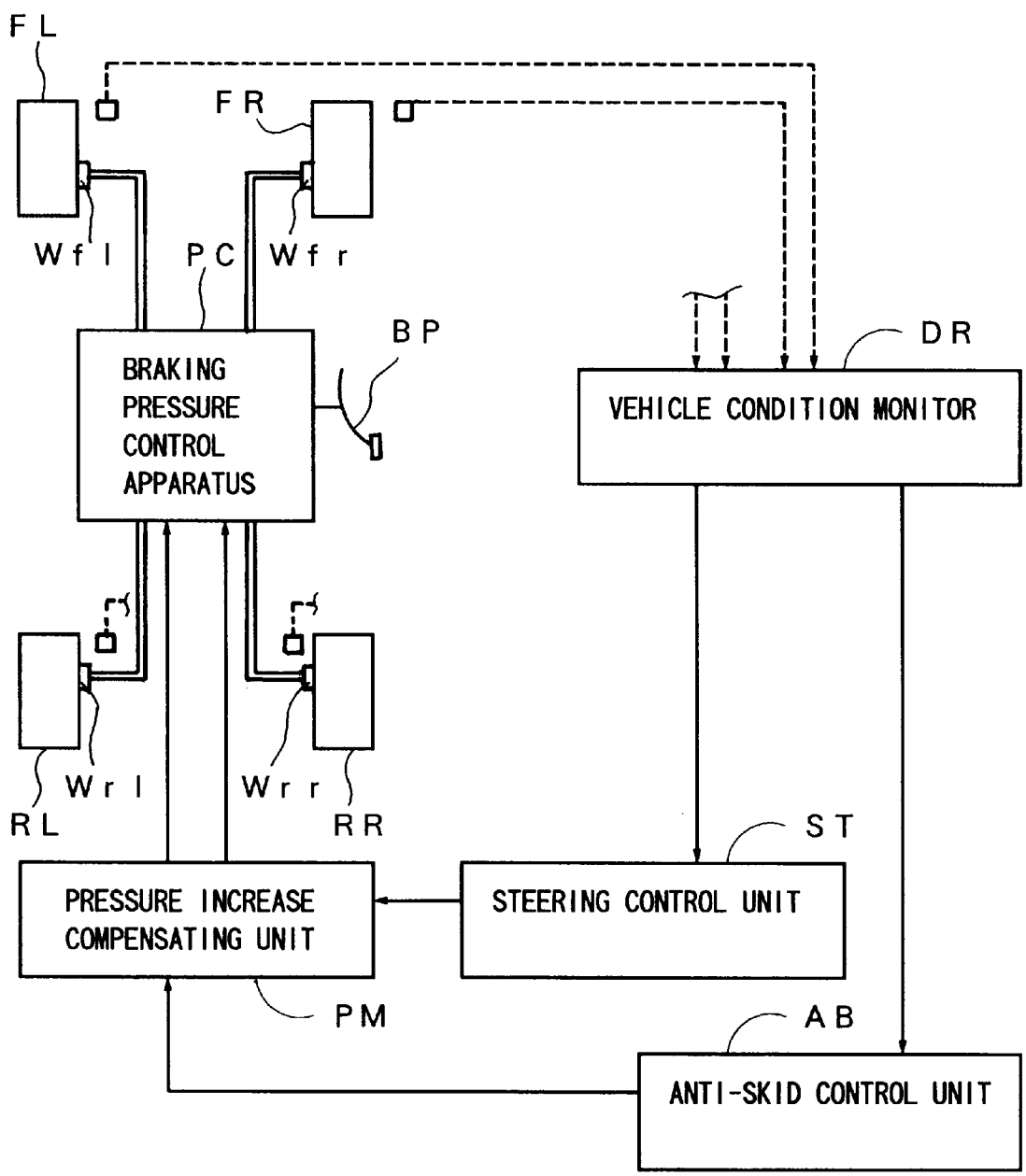
FIG. 1 is a general block diagram illustrating a vehicle motion control system according to an embodiment of the present invention.

Referring to FIG. 1, there is schematically illustrated a vehicle motion control system according to the present invention, which controls a hydraulic braking pressure in each of wheel brake cylinders Wfl, Wfr, Wrl, Wrr which are operatively mounted on wheels FL, FR, RL, RR of the vehicle, respectively, to control a braking force applied to each wheel individually. The system includes a hydraulic braking pressure control apparatus PC for controlling the braking pressure in each of the wheel brake cylinders at least in response to depression of a brake pedal BP, a vehicle condition monitor DR for monitoring a condition of the vehicle in motion. The system further includes a steering control unit ST for actuating the apparatus PC to increase and decrease the braking pressure in at least one of the wheel brake cylinders operatively mounted on at least one of the wheels to control the braking force applied thereto, on the basis of the output of the monitor DR and irrespective of depression of the brake pedal BP, and an anti-skid control unit AB for actuating the apparatus PC to decrease and increase the braking pressure in at least one of the wheel brake cylinders operatively mounted on at least one of the wheels to control the braking force applied thereto, in response to a rotational condition thereof during braking, on the basis of the output of the monitor DR. And, a pressure increase compensating unit PM is provided for controlling a pressure increasing rate for increasing the braking pressure to a desired pressure which is set after the pressure decreasing operation made by the apparatus PC when the braking pressure with respect to at least one of the wheels is controlled in accordance with the control performed by the steering control unit ST and the control performed by the anti-skid control unit AB simultaneously, to be greater than a pressure increasing rate for increasing the braking pressure to the desired pressure in accordance with the control performed only by the anti-skid control unit AB.

The hydraulic braking pressure control apparatus PC is adapted to provide a plurality of control modes including a rapid pressure increase mode for increasing the braking pressure in at least one of the wheel brake cylinders by a relatively rapid rate comparing with the other control modes, and the pressure increase compensating unit PM is adapted to provide the rapid pressure increase mode when the braking pressure with respect to at least one of the wheels is controlled in accordance with the control performed by the steering control unit ST and the control performed by the anti-skid control unit AB simultaneously, for a longer period than the period during which the rapid pressure increase mode is provided when the braking pressure is controlled in accordance with the control performed only by the anti-skid control unit AB.

The apparatus PC may be adapted to provide a plurality of control modes including a pulse pressure increase mode for increasing the braking pressure in at least one of the wheel brake cylinders gradually by increasing the braking pressure therein intermittently in accordance with a duty ratio, and the pressure increase compensating unit PM may be adapted to set the duty ratio for the pulse pressure increase mode when the braking pressure with respect to at least one of the wheels is controlled in accordance with the control performed by the steering control unit ST and the control performed by the anti-skid control unit AB simultaneously, to be greater than the duty ratio for the pulse pressure increase mode which is set when the braking pressure is controlled in accordance with the control performed only by the anti-skid control unit AB. The pulse pressure increase mode is a pressure control mode for gradually increasing the braking pressure in the wheel brake cylinder by communicating the wheel brake cylinder with a pressure source to increase the braking pressure therein, and blocking the communication to hold the braking pressure, alternately, and also called as a stepped pressure increase.

Figure 2:
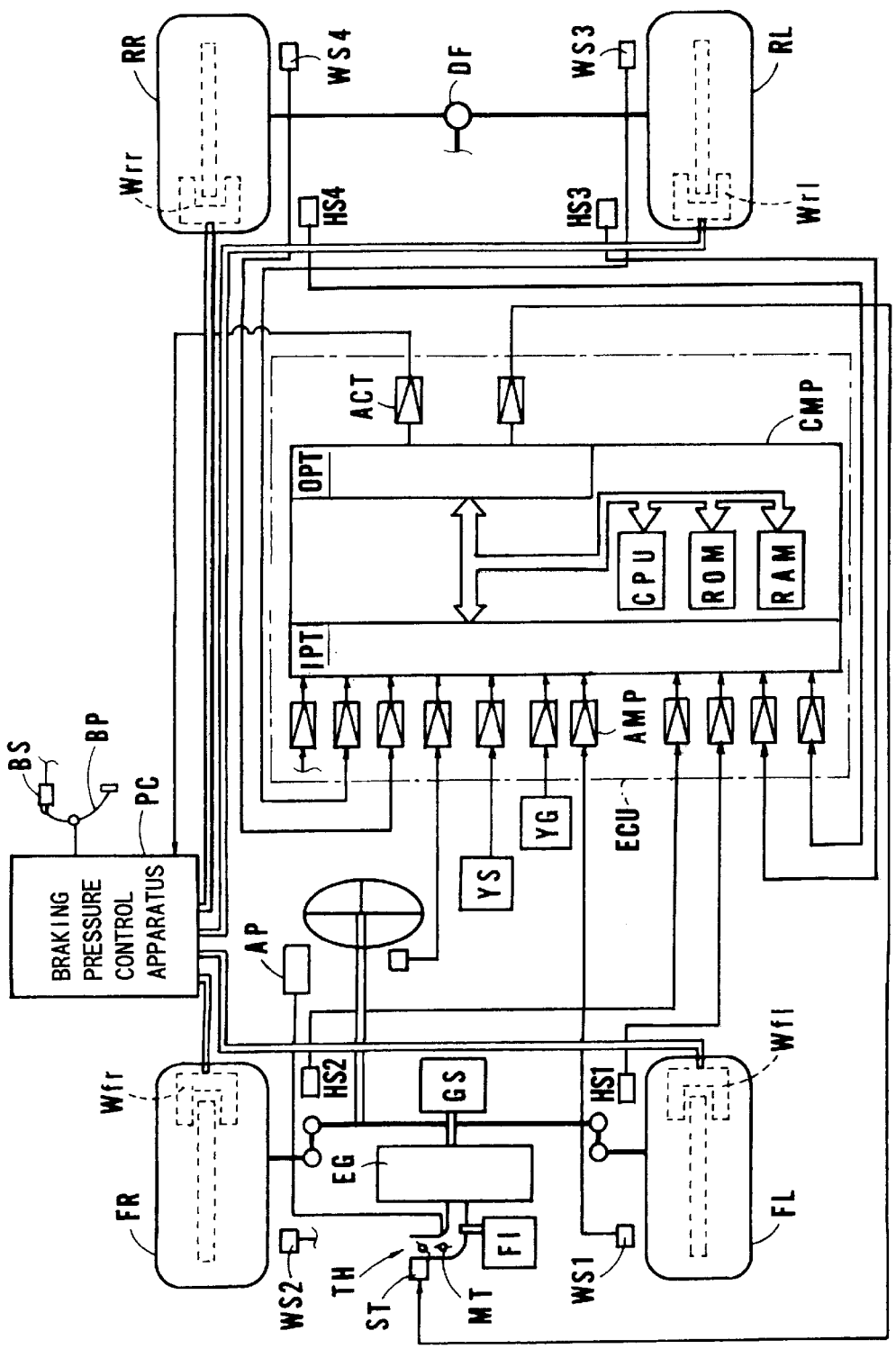
FIG. 2 is a schematic block diagram of a vehicle including the vehicle motion control system of an embodiment of the present invention.

More specifically, the details of the embodiment disclosed in FIG. 1 are illustrated in FIGS. 2 to 12. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 3:
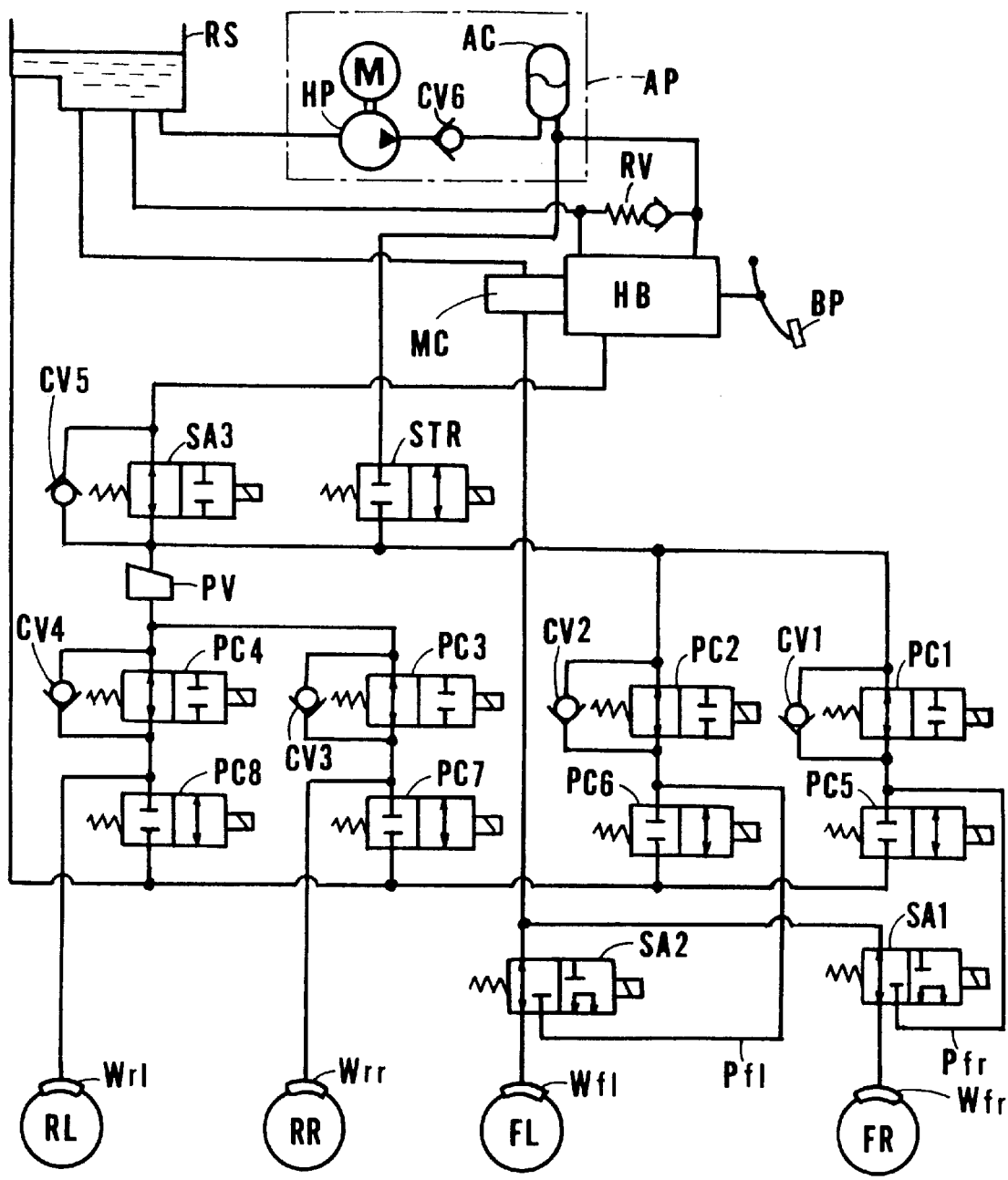
FIG. 3 is a block diagram illustrating an embodiment of a hydraulic braking pressure control apparatus for use in an embodiment of the present invention.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The pressure control apparatus PC in the present embodiment may be arranged as illustrated in FIG. 3 which will be explained later in detail.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU.

There are also provided a brake switch BS which turns on when the brake pedal BP is depressed, and turns off when the brake pedal BP is released, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 8, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 3 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wfr and so on, a solenoid valve SA3, solenoid valves PC1–PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 3 to form a front and rear dual circuit system according to the present embodiment, while a diagonal circuit system may be employed.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 3, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 3, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1–PC8 are controlled by the electronic controller ECU to provide various control modes for controlling the stability of the vehicle, such as the steering control by braking, anti-skid control, and other various control modes. For example, when it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. When it is determined that the excessive understeer occurs while a vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above-described oversteer restraining control and understeer restraining control as a whole may be called as a steering control by braking.

Accordingly, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1–PC8 placed in their open positions. Consequently, with the solenoid valves PC1–PC8 energized or de-energized, the hydraulic pressure in each wheel brake cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the oversteer restraining control and/or the understeer restraining control can be performed, as noted previously.

Figure 4:
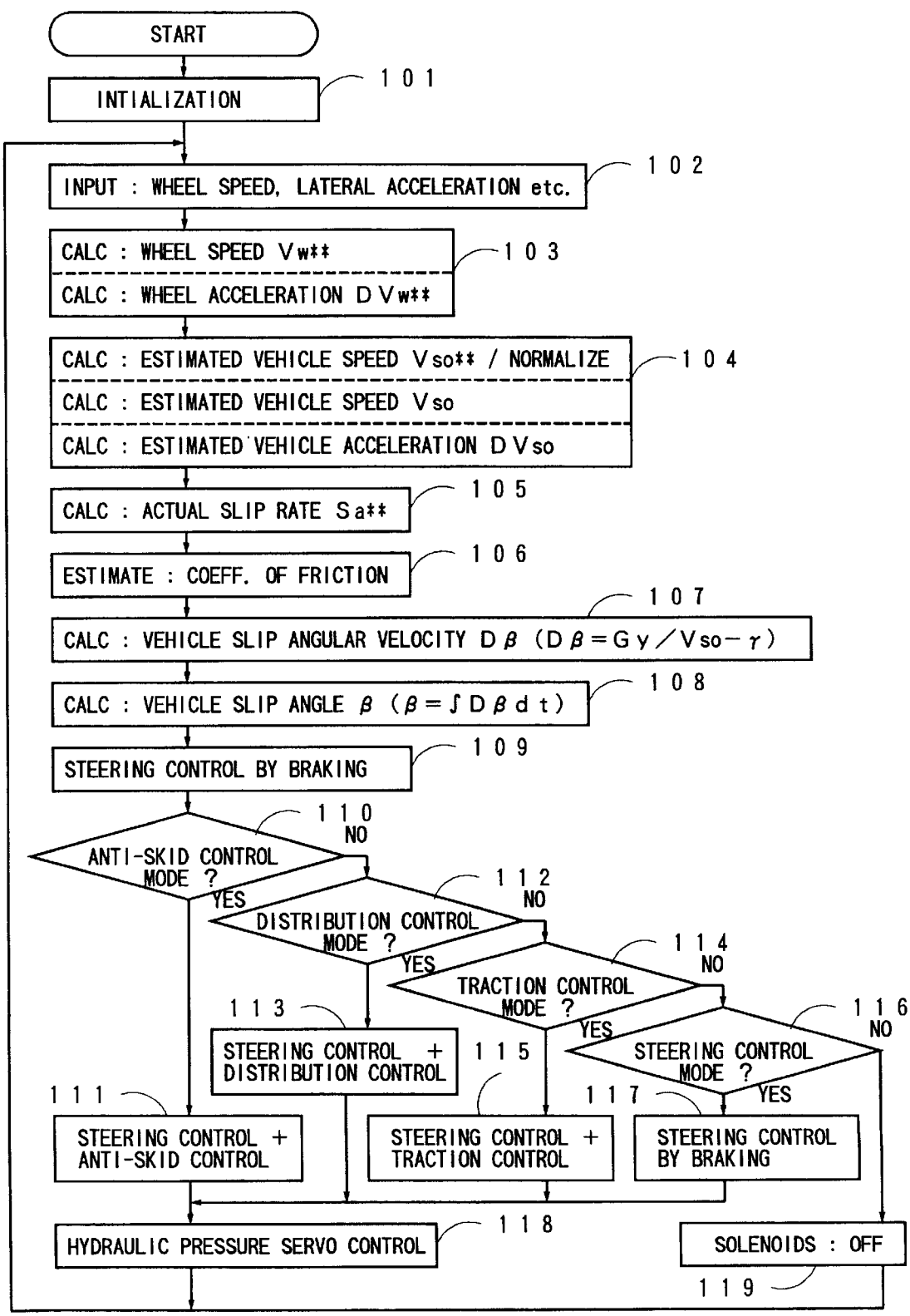
FIG. 4 is a flowchart showing a main routine of the vehicle motion control according to an embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 8. The program routine starts when an ignition switch (not shown) is turned on. At the outset, the program for the vehicle motion control as shown in FIG. 4 provides for initialization of the system at Step 101 to clear various data. At Step 102, the signals detected by the wheel speed sensors WS1 to WS4 are read by the electronic controller ECU, and also read are the signal (steering angle δ f) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. The maximum of the wheel speeds Vw for four wheels is calculated to provide an estimated vehicle speed Vso on a gravity center of the vehicle (Vso=MAX[Vw]), an estimated vehicle speed Vso is calculated for each wheel, respectively, on the basis of the wheel speed Vw at Step 104. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration DVso. At Step 105, also calculated is an actual slip rate Sa on the basis of the wheel speed Vw for each wheel and the estimated vehicle speed Vso (or, the estimated and normalized vehicle speed NVso**) which are calculated at Steps 103 and 104, respectively, in accordance with the following equation:

$$Sa^{}=(Vso-Vw^{})/Vso$$

Then, at Step 106, on the basis of the vehicle acceleration DVso and the actual lateral acceleration Gya detected by the lateral acceleration sensor YG, the coefficient of friction $\mu$ against a road surface can be calculated in accordance with the following equation:

$$\mu \approx (DVso^2+Gya^2)^{1/2}$$

In order to detect the coefficient of friction against the road surface, various methods may be employed other than the above method, such as a sensor for directly detecting the coefficient of friction against the road surface, for example.

The program proceeds to Step 107, a vehicle slip angular velocity D β is calculated, and a vehicle slip angle β is calculated at Step 108. This vehicle slip angle β is an angle which corresponds to a vehicle slip against the vehicle's path of travel, and which can be estimated as follows. That is, at the outset, the vehicle slip angular velocity D β, which is a differentiated value of the vehicle slip angle β, is calculated at Step 107 in accordance with the following equation:

$$D\ \beta = Gy/Vso - \gamma$$

Then, the vehicle slip angle β is calculated at Step 108 in accordance with the following equation:

$$\beta = \int (Gy/Vso-\gamma)dt$$

where "Gy" is the lateral acceleration of the vehicle, "Vso" is the estimated vehicle speed of the vehicle measured at its gravity center, and "γ" is the yaw rate.

The vehicle slip angle β may be calculated in accordance with the following equation:

$$\beta = \tan^{-1}(Vy/Vx)$$

where "Vx" is a longitudinal vehicle speed, and "Vy" is a lateral vehicle speed.

Then, the program proceeds to Step 109 where an operation for the steering control by braking is made to provide a desired slip rate for use in the steering control by braking, wherein the braking force applied to each wheel is controlled at Step 117 through the hydraulic pressure servo control which will be explained later, so that the pressure control apparatus PC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 110, where it is determined whether the condition for initiating the anti-skid control is fulfilled or not. If it is determined that the condition is in the anti-skid control mode, the specific initial control is terminated immediately at Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. If it is determined at Step 116 that the condition for initiating the steering control by braking has not been fulfilled, the program proceeds to Step 119 where solenoids for all of the solenoid valves are turned off, and then the program returns to Step 102. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to prevent the driven wheel from slipping during the vehicle driving operation.

Figure 5:
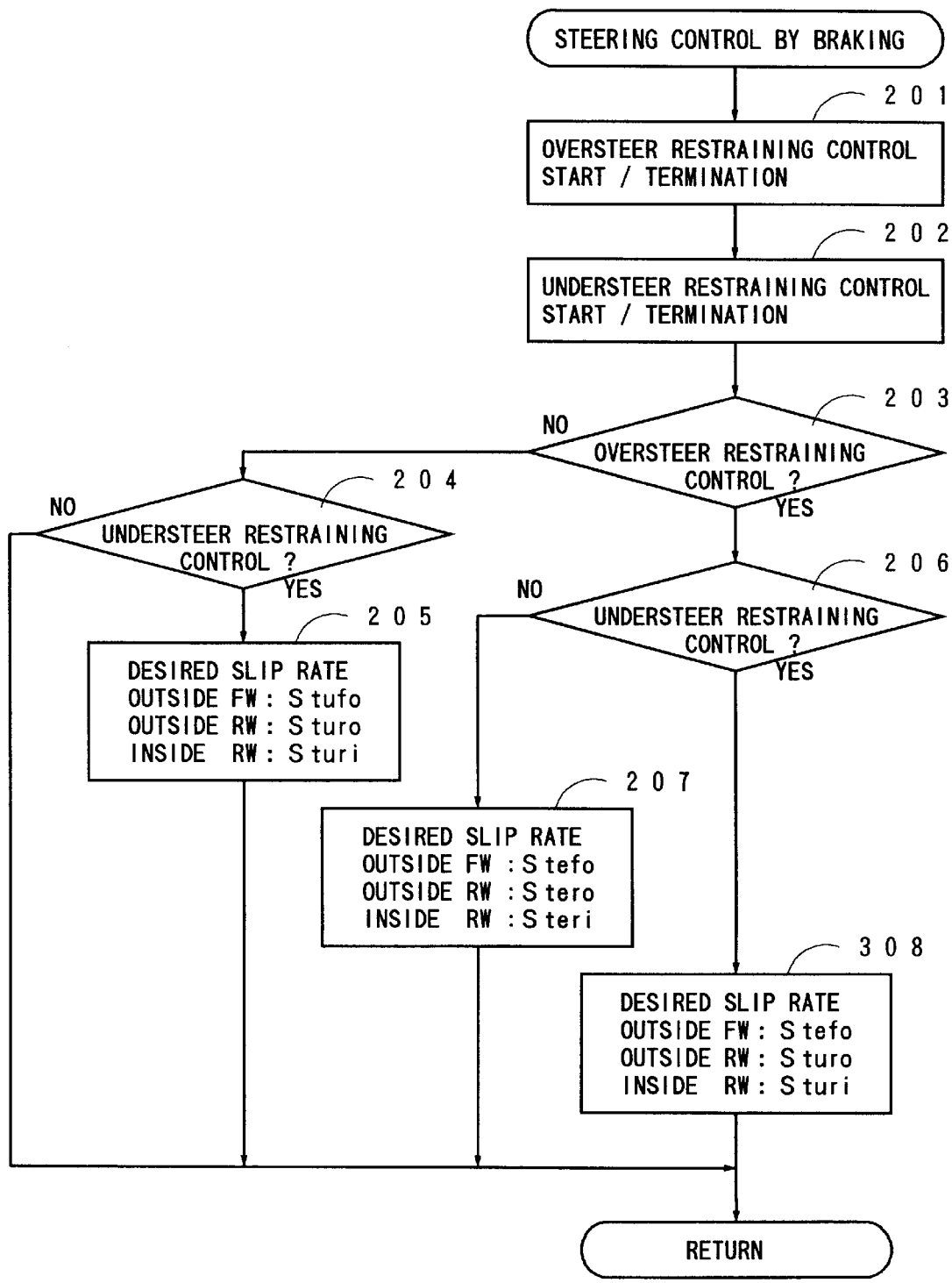
FIG. 5 is a flowchart showing a sub-routine of a steering control by braking according to an embodiment of the present invention.

FIG. 5 shows a flowchart for setting desired slip rates which are to be provided at Step 109 in FIG. 4 for the operation of the steering control by braking, which includes the oversteer restraining control and the understeer restraining control. Through this flowchart, therefore, the desired slip rates are set in accordance with the oversteer restraining control and/or the understeer restraining control.

Figure 9:
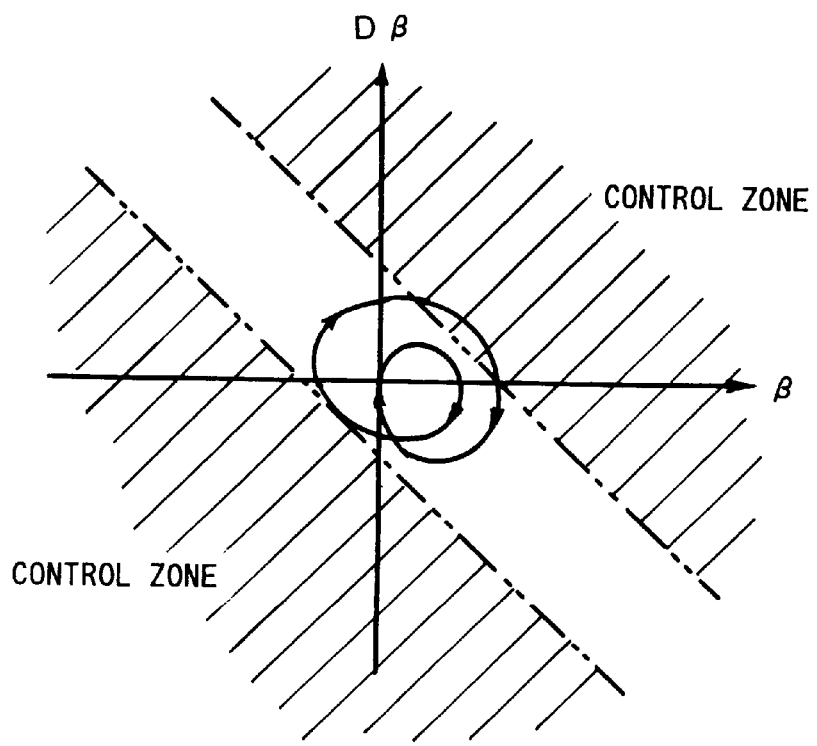
FIG. 9 is a diagram showing a region for determining start and termination of the oversteer restraining control according to an embodiment of the present invention.

At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a β-D β plane as shown in FIG. 9. That is, if the vehicle slip angle β and the vehicle slip angular velocity D β which are calculated when determining the start or termination, are fallen within the control zone, the oversteer restraining control will be started. However, if the vehicle slip angle β and the vehicle slip angular velocity D β come to be out of the control zone, the oversteer restraining control will be controlled as indicated by the arrow in FIG. 9 thereby to be terminated. Therefore, the boundary between the control zone and non-control zone (as indicted by two dotted chain line in FIG. 9) corresponds to the boundary of a starting zone. And, the braking force applied to each wheel is controlled in such a manner that the farther they remote from the boundary between the control zone and non-control zone (two dotted chain line in FIG. 9) toward the control zone, the more the amount to be controlled will be provided.

Figure 10:
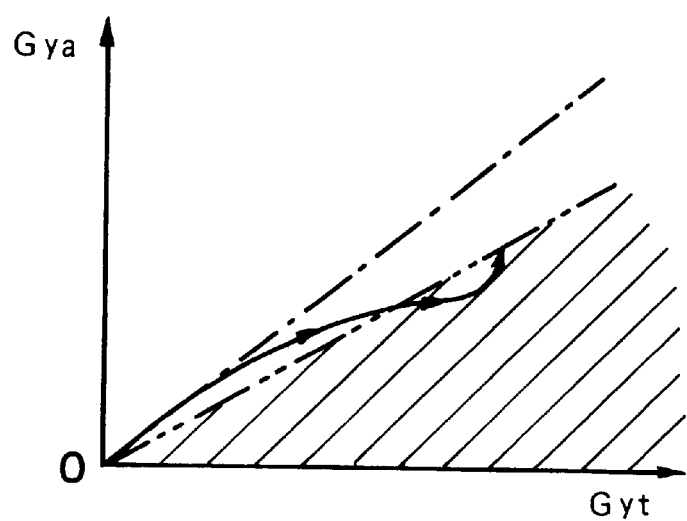
FIG. 10 is a diagram showing a region for determining start and termination of the understeer restraining control according to an embodiment of the present invention.

On the other hand, the determination of the start and termination is made at Step 202 on the basis of the determination whether it is within a control zone indicated by hatching in FIG. 10. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 10 thereby to be terminated.

Then, the program proceeds to Step 203, where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not.

In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control set at Step 207, the vehicle slip angle β and the vehicle slip angular velocity D β are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt = \gamma(\theta f) \cdot Vso;$$

$$\gamma(\theta f) = \{\theta f/(N \cdot L)\} \cdot Vso/(1 + Kh \cdot Vso^2)$$

where "Kh" is a stability factor, "N" is a steering gear ratio, and "L" is a wheelbase of the vehicle.

At Step 205, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured actual value indicated by "a". Then, "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control. In FIG. 5, "FW" indicates a front wheel and "RW" indicates a rear wheel.

Whereas, at Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$\text{Stefo} = K1 \cdot \beta + K2 \cdot D\beta$$

$$\text{Stero} = K3 \cdot \beta + K4 \cdot D\beta$$

$$\text{Steri} = K5 \cdot \beta + K6 \cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$\text{Stufo} = K7 \cdot \Delta Gy$$

$$\text{Sturo} = K8 \cdot \Delta Gy$$

$$\text{Sturi} = K9 \cdot \Delta Gy$$

where K7 is a constant for providing the desired slip rate Stufo which is used for increasing the braking pressure (or, alternatively decreasing the braking pressure), while K8 and K9 are constants for providing the desired slip rates Sturo, Sturi both of which are used for increasing the braking pressure.

Figure 6:
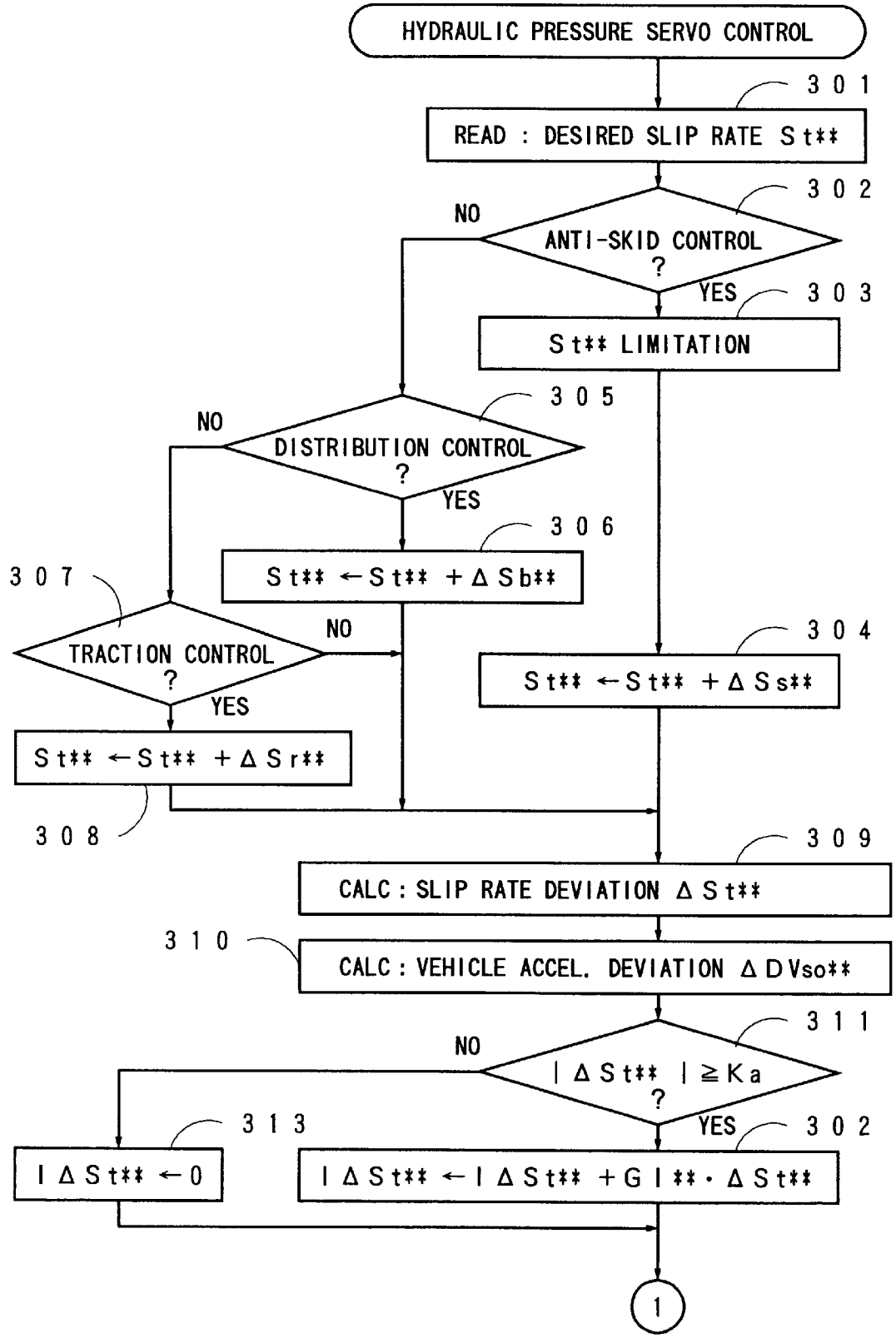
FIG. 6 is a flowchart showing a hydraulic pressure servo control according to an embodiment of the present invention.
Figure 7:
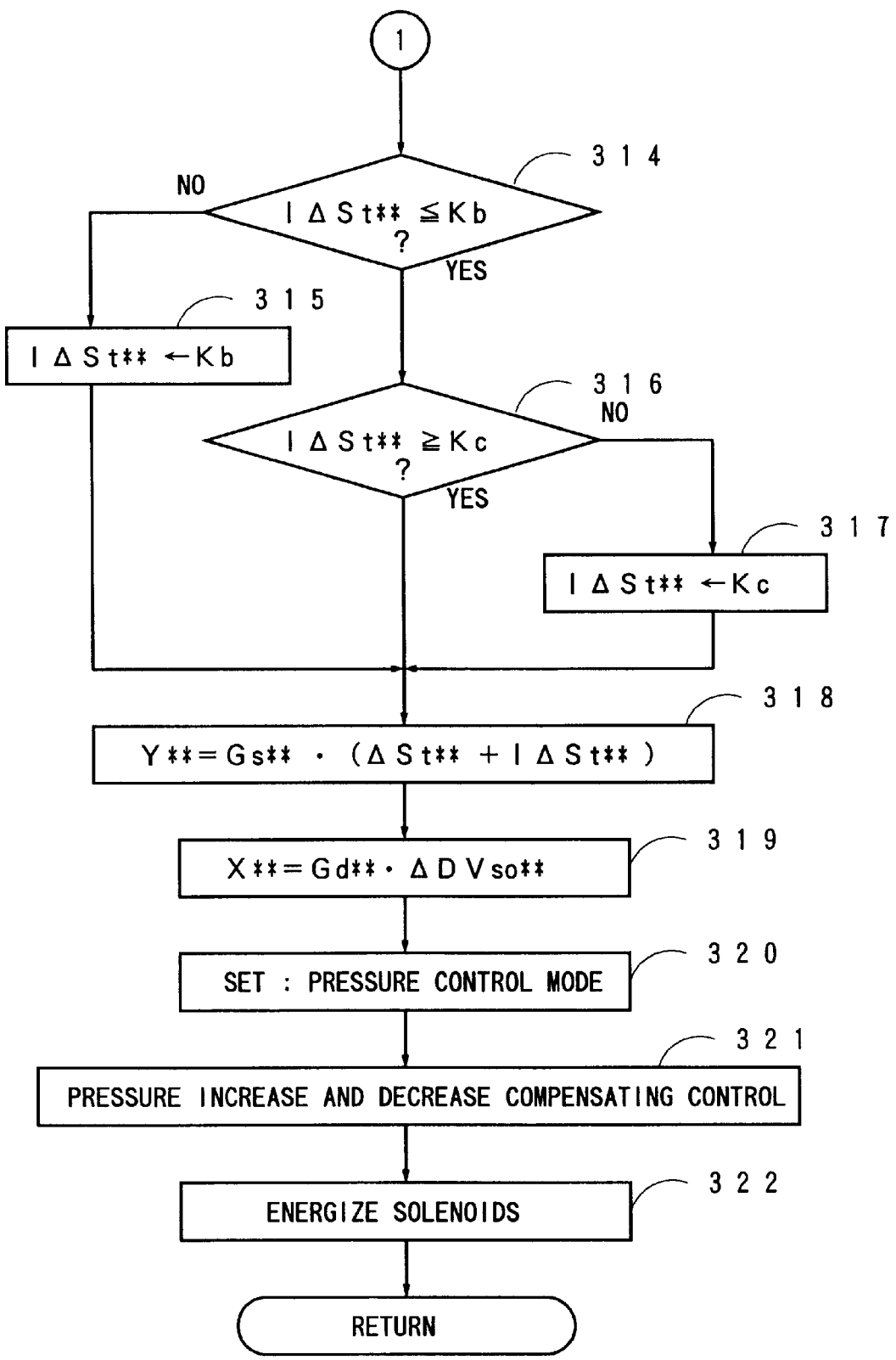
FIG. 7 is a flowchart showing a hydraulic pressure servo control according to an embodiment of the present invention.
Figure 13:
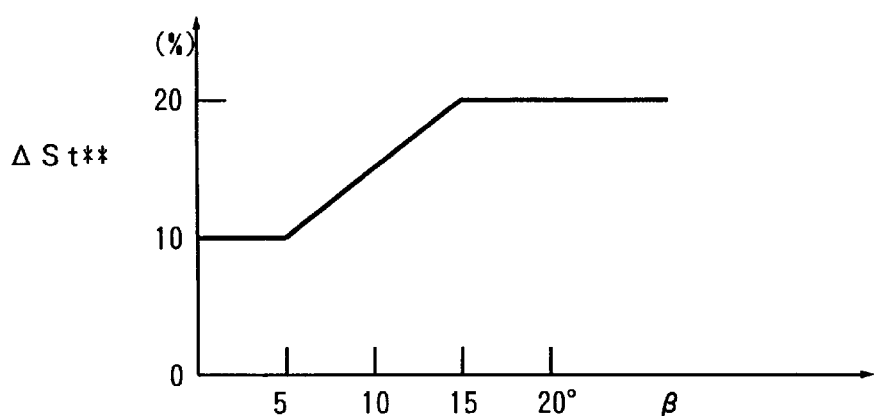
FIG. 13 is a diagram showing a relationship between a vehicle slip angle $\beta$ and a desired slip rate $St^{**}$ when an anti-skid control is performed according to an embodiment of the present invention.

FIGS. 6 and 7 show the hydraulic pressure servo control which is executed at Step 117 in FIG. 4, and wherein the wheel cylinder pressure for each wheel is controlled through the slip rate servo control. At Step 301, desired slip rates St, which are set at Step 205, 207, or 208, are read to provide the desired slip rate for each wheel of the vehicle. Then, the program proceeds to Step 302 where it is determined whether the anti-skid control is to be performed or not. If the result is affirmative, the program proceeds to Step 303 where a predetermined limitation is applied to the desired slip rate St, as shown in FIG. 13. That is, in the case where the desired slip rate St, which is set on the basis of the vehicle slip angle β in accordance with the steering control by braking, exceeds 20%, it is set to the value smaller than 20%, when the anti-skid control is being performed. Then, the program proceeds to Step 304 where a compensating slip rate for the anti-skid control ΔSs is added to the desired slip rate St to renew the desired slip rate St. If it is determined at Step 302 that the anti-skid control is not to be performed, the program proceeds to Step 305 where it is determined whether the front and rear braking force distribution control is to be performed or not. If the result is affirmative, the program proceeds to Step 306 where a compensating slip rate for the braking force distribution control ΔSb is added to the desired slip rate St to renew it.

If it is determined at Step 305 that the braking force distribution control is not to be performed, the program proceeds to Step 307 where it is determined whether the traction control is to be performed or not. If the result is affirmative, the program proceeds to Step 308 where a compensating slip rate for the traction control ΔSr is added to the desired slip rate St to renew it. After the desired slip rate St is renewed at Step 304, 306 or 308, the program proceeds to Step 309, where a slip rate deviation ΔSt is calculated for each wheel, and further proceeds to Step 310 where a vehicle acceleration deviation ΔDVso** is calculated. If it is determined at Step 307 that the traction control is not to be performed, the program directly proceeds to Step 309. The desired slip rates for the control modes as shown in FIGS. 5 and 6 other than the above-described anti-skid control, braking force distribution control and traction control are omitted in FIG. 6, but shall be provided as well.

Then, the program proceeds to Step 309 where a slip rate deviation ΔSt is calculated for each wheel, and further proceeds to Step 310 where a vehicle acceleration deviation ΔDVso is calculated. At Step 309, the difference between the desired slip rate St and the actual slip rate Sa is calculated to provide the slip rate deviation ΔSt (i.e., ΔSt=St−Sa). And, at Step 310, the difference between the estimated vehicle acceleration DVso on the center of gravity of the vehicle and the vehicle acceleration DVso of a wheel to be controlled is calculated to provide the vehicle acceleration deviation ΔDVso. The actual slip rate Sa and the vehicle acceleration deviation ΔDVso may be calculated in accordance with a specific manner which is determined in dependence upon the control modes such as the anti-skid control mode, traction control mode, or the like.

Then, the program proceeds to Step 311 where the slip rate deviation ΔSt is compared with a predetermined value Ka. If an absolute value of the slip rate deviation |ΔSt| is equal to or greater than the predetermined value Ka, the program proceeds to Step 312 where an integrated value (IΔSt) of the slip rate deviation ΔSt is renewed. That is, a value of the slip rate deviation ΔSt multiplied by a gain GI is added to the integrated value of the slip rate deviation IΔSt obtained at the previous cycle of this routine to provide the integrated value of the slip rate deviation IΔSt at the present cycle. If the absolute value of the slip rate deviation |ΔSt| is smaller than the predetermined value Ka, the program proceeds to Step 313 where the integrated value of the slip rate deviation IΔSt is cleared to be zero (0). Then, the program proceeds to Steps 314 to 317 as shown in FIG. 7, where the slip rate deviation IΔSt is limited to a value which is equal to or smaller than an upper limit value Kb, or which is equal to or greater than a lower limit value Kc. If the slip rate deviation IΔSt is greater than the upper limit Kb, it is set to be the value Kb at Step 315, whereas if the slip rate deviation IΔSt** is smaller than the lower limit Kc, it is set to be the value Kc at Step 317.

Figure 11:
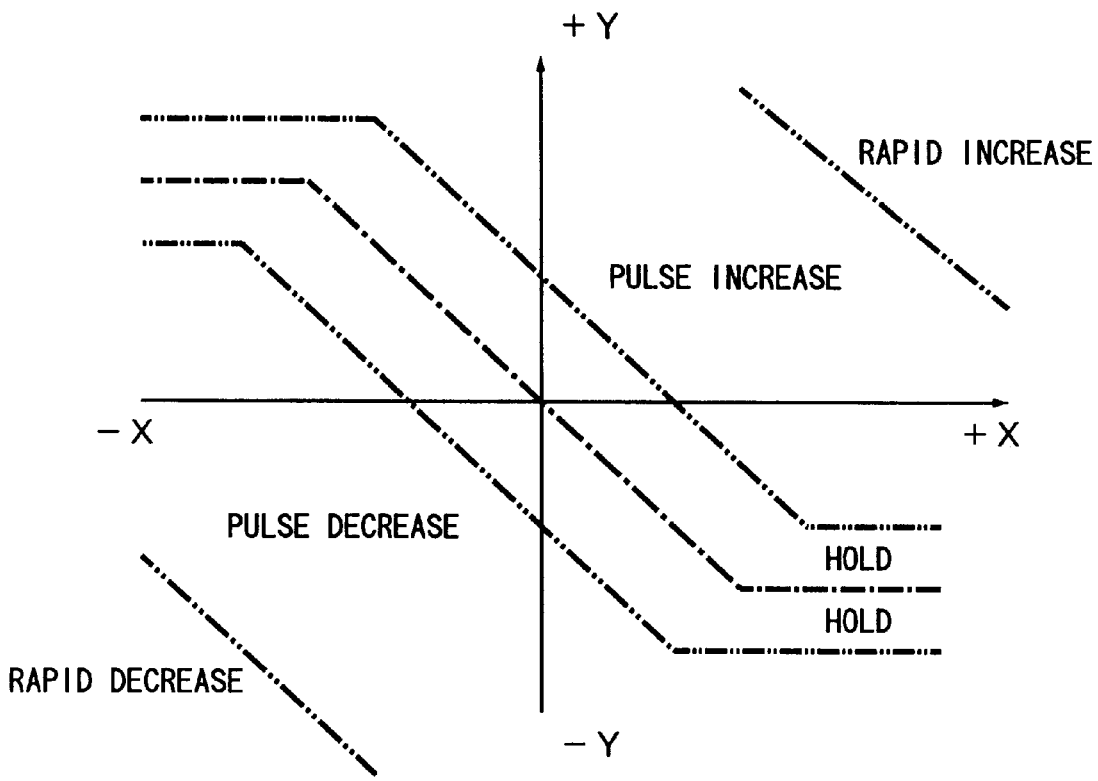
FIG. 11 is a diagram showing a relationship between the pressure control modes and parameters for use in the hydraulic braking pressure control according to an embodiment of the present invention.
Figure 12:
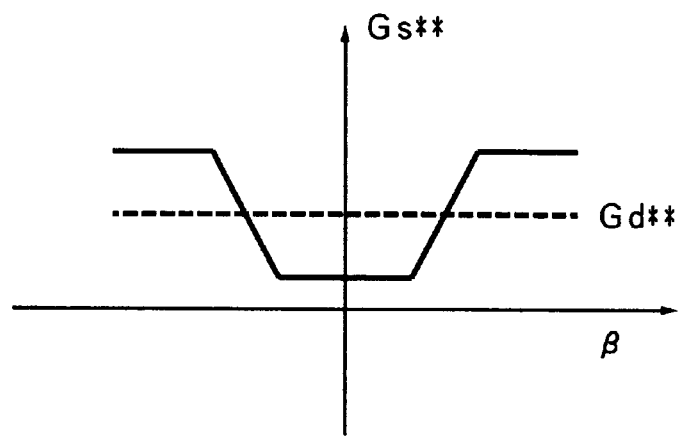
FIG. 12 is a diagram showing a relationship between a vehicle slip angle and a gain for calculating the parameters according to an embodiment of the present invention.

Thereafter, the program proceeds to Step 318 where a parameter Y** for providing a hydraulic pressure control in each control mode is calculated in accordance with the following equation:

$$Y^{} = Gs^{} \cdot (\Delta St^{} + I\Delta St^{})$$

where "Gs" is a gain, which is provided in response to the vehicle slip angle β and in accordance with a diagram as shown by a solid line in FIG. 12. The program further proceeds to Step 319 where another parameter X is calculated in accordance with the following equation:

$$X^{} = Gd^{} \cdot \Delta DVso^{**}$$

where "Gd" is a gain which is a constant value as shown by a broken line in FIG. 12. On the basis of the parameters X and Y, a pressure control mode for each wheel is provided at Step 320, in accordance with a control map as shown in FIG. 11. The control map has a rapid pressure decreasing zone, a pulse pressure decreasing zone, a pressure holding zone, a pulse pressure increasing zone, and a rapid pressure increasing zone which are provided in advance as shown in FIG. 11, so that any one of the zones is selected in accordance with the parameters X and Y** at Step 320. In the case where no control mode is performed, no pressure control mode is provided (i.e., solenoids are off). At Step 321, is performed a pressure increase and decrease compensating control, which will be described later. Finally, the program proceeds to Step 322 where the solenoid of each valve in the hydraulic pressure control apparatus PC is energized or de-energized in accordance with the mode determined by the selected pressure control zone or the pressure increase and decrease compensating control thereby to control the braking force applied to each wheel.

Figure 8:
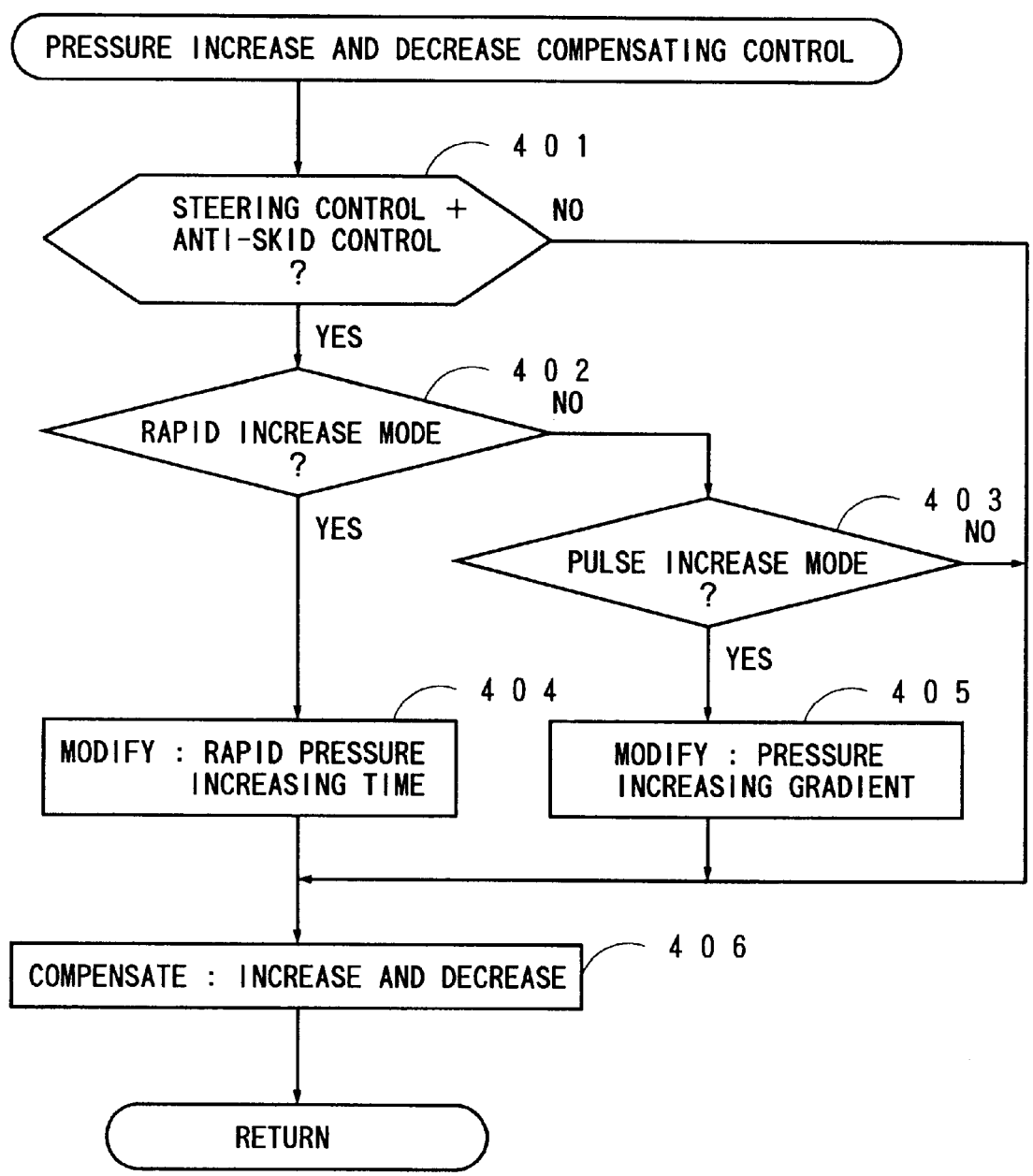
FIG. 8 is a flowchart showing a pressure increase and decrease compensating control according to an embodiment of the present invention.

FIG. 8 shows a pressure increase compensating control as an example of the pressure increase and decrease compensating control performed at Step 321. At the outset, it is determined at Step 401 whether the mode of "steering control+anti-skid control" which is set at Step 111 for performing both of the steering control by braking and the anti-skid control, has been set or not. If it is determined that the mode of "steering control+anti-skid control" has been set, the program proceeds to Step 402 where it is determined whether the rapid pressure increase mode has been set or not. If it is determined that the rapid pressure increase mode has not been set, then the program further proceeds to Step 403 where it is determined whether the pulse pressure increase mode has been set or not. Accordingly, in case of the rapid pressure increase mode, a rapid pressure increasing time is modified at Step 404, whereas in case of the pulse pressure increase mode, a pressure increasing gradient is modified at Step 405.

At Step 404, the rapid pressure increasing time is modified by setting the rapid pressure increasing time for the "steering control+anti-skid control" mode to be longer than the rapid pressure increasing time only for the anti-skid control mode. For example, a coefficient of desired pressure which is to be set in response to the total pressure decreasing time by the previous cycle is multiplied by a constant Kt (e.g., Kt=1.2). In practice, the pressure increasing time for the anti-skid control mode is multiplied by the constant Kt to provide the pressure increasing time for the "steering control+anti-skid control" mode.

Figure 14:
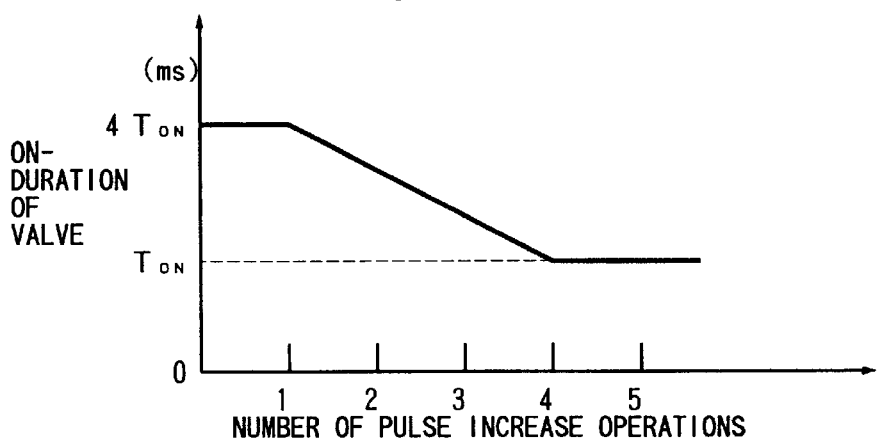
FIG. 14 is a diagram showing a relationship between number of pulse pressure increasing controls and ON-duration of a pulse pressure increase signal according to an embodiment of the present invention.
Figure 15:
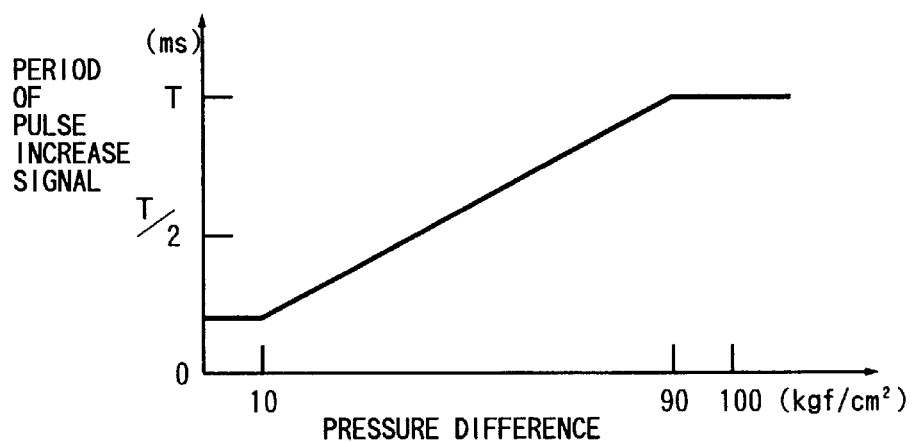
FIG. 15 is a diagram showing a relationship between a period of the pulse pressure increase signal and a difference between master cylinder pressure and wheel cylinder pressure according to an embodiment of the present invention.

The pressure increasing gradient which is to be modified in the pulse pressure increase mode at Step 405 is performed by setting a duty ratio for the mode of "steering control+anti-skid control" to be greater than the duty ratio only for the anti-skid control mode, on the basis of parameters obtained from maps as shown in FIGS. 14, 15. That is, a pressure increasing time, i.e., ON-duration of the solenoid valve is set in response to number of pulse pressure increase operations, as shown in FIG. 14. Also, a period of the pulse pressure increase signal is set in response to a difference between the master cylinder pressure and the wheel cylinder pressure, as shown in FIG. 15. Then, the program proceeds to Step 406 where further pressure increase and decrease compensating controls are performed, such as the compensating control only for the anti-skid control mode, and the compensating control performed in accordance with variety of the master cylinder pressure and the wheel cylinder pressure, explanation of which will be omitted.

Figure 16:
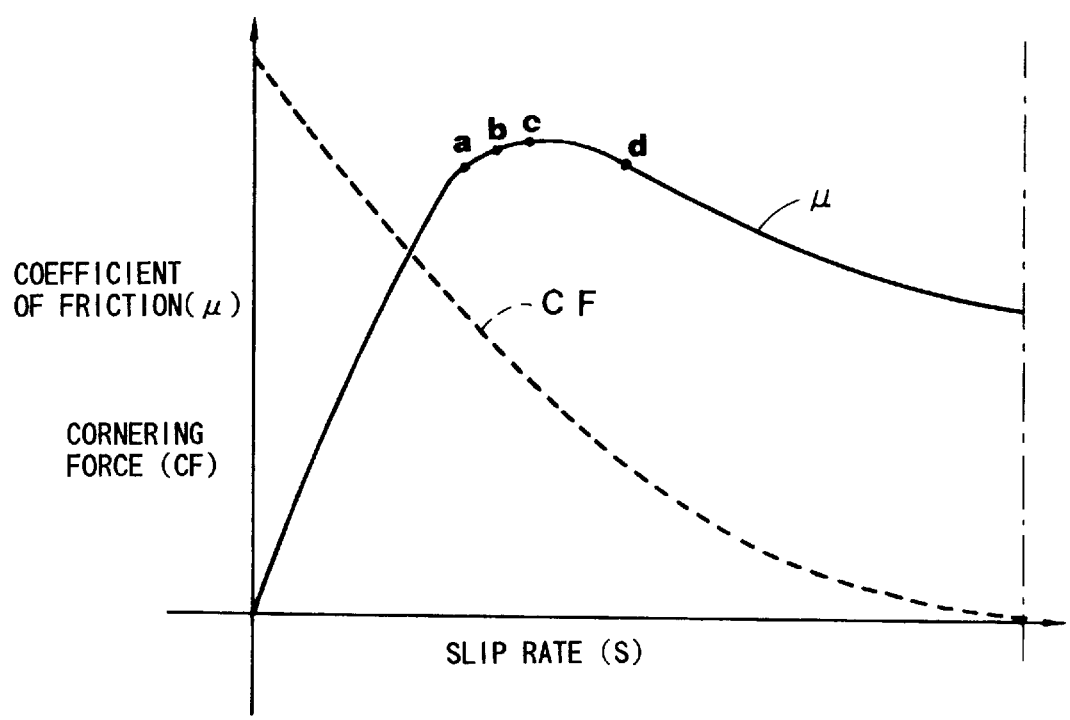
FIG. 16 is a diagram showing a relationship between a coefficient of friction of a road and a slip rate in a conventional vehicle.
Figure 17:
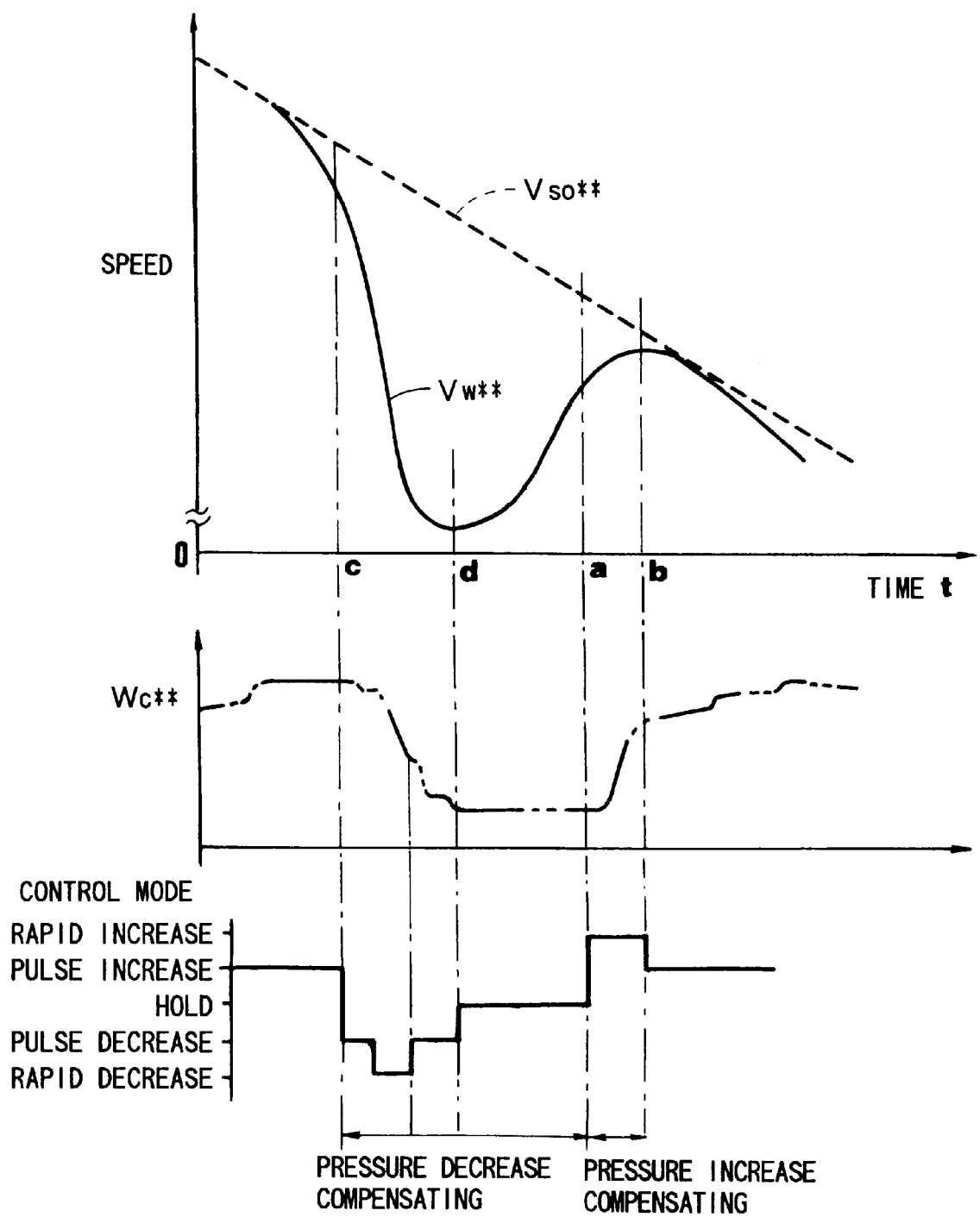
FIG. 17 is a diagram showing a wheel to be controlled is under an anti-skid control in an anti-skid control system.

Then, with the above-described Steps 404, 405 executed, the desired slip rate St is increased rapidly, so that immediate transition from the point (c) to the point (d) in FIG. 16 (beyond the μ-peak) can be made, and that the cornering force CF can be decreased rapidly. Consequently, the steering control by braking can be performed effectively, even if the anti-skid control is being performed. Furthermore, any excessive control can be prevented, because the upper limit is provided for the compensating slip rate for the anti-skid control ΔSs at Step 303.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle is in motion, by controlling a hydraulic braking pressure in each of wheel brake cylinders operatively mounted on wheels of said vehicle, respectively, to control a braking force applied thereto, comprising:

a hydraulic braking pressure control apparatus for controlling the braking pressure in each of said wheel brake cylinders at least in response to depression of a brake pedal;

vehicle condition monitor means for monitoring a condition of said vehicle in motion;

steering control means for actuating said apparatus to increase and decrease the braking pressure in at least one of said wheel brake cylinders operatively mounted on at least one of said wheels to control the braking force applied thereto, on the basis of the output of said monitor means and irrespective of depression of said brake pedal;

anti-skid control means for actuating said apparatus to decrease and increase the braking pressure in at least one of said wheel brake cylinders operatively mounted on at least one of said wheels to control the braking force applied thereto, in response to a rotational condition thereof during braking, on the basis of the output of said monitor means; and pressure increase compensating means for controlling a pressure increasing rate for increasing the braking pressure to a desired pressure which is set after the pressure decreasing operation made by said apparatus when the braking pressure with respect to said at least one of said wheels is controlled in accordance with the control performed by said steering control means and the control performed by said anti-skid control means simultaneously, to be greater than a pressure increasing rate for increasing the braking pressure to the desired pressure in accordance with the control performed only by said anti-skid control means.

2. A vehicle motion control system as set forth in claim 1, wherein said hydraulic braking pressure control apparatus is adapted to provide a plurality of control modes including a rapid pressure increase mode for increasing the braking pressure in at least one of said wheel brake cylinders by a relatively rapid rate comparing with the other control modes, and wherein said pressure increase compensating means is adapted to provide the rapid pressure increase mode when the braking pressure with respect to at least one of said wheels is controlled in accordance with the control performed by said steering control means and the control performed by said anti-skid control means simultaneously, for a longer period than the period during which the rapid pressure increase mode is provided when the braking pressure is controlled in accordance with the control performed only by said anti-skid control means.

3. A vehicle motion control system as set forth in claim 2, wherein a pressure increasing time for the control performed only by said anti-skid control means is multiplied by a constant to provide a pressure increasing time for the control performed by said steering control means and said anti-skid control means simultaneously.

4. A vehicle motion control system as set forth in claim 1, wherein said hydraulic braking pressure control apparatus is adapted to provide a plurality of control modes including a pulse pressure increase mode for increasing the braking pressure in at least one of said wheel brake cylinders gradually by increasing the braking pressure therein intermittently in accordance with a duty ratio, and wherein said pressure increase compensating means is adapted to set the duty ratio for the pulse pressure increase mode when the braking pressure with respect to at least one of said wheels is controlled in accordance with the control performed by said steering control means and the control performed by said anti-skid control means simultaneously, to be greater than the duty ratio for the pulse pressure increase mode which is set when the braking pressure is controlled in accordance with the control performed only by said anti-skid control means.

5. A vehicle motion control system as set forth in claim 1, further comprising:

desired slip rate setting means for setting a desired slip rate for each wheel of said vehicle during braking, said hydraulic braking pressure control apparatus being controlled in response to the desired slip rate, and wherein said desired slip rate setting means is adapted to limit the desired slip rate which is set when the braking pressure with respect to at least one of said wheels is controlled in accordance with the control performed by said steering control means and the control performed by said anti-skid control means simultaneously, to be lower than a predetermined value.

* * * * *